United States Patent
Hauptvogel

(10) Patent No.: US 12,420,730 B2
(45) Date of Patent: Sep. 23, 2025

(54) ENERGY ABSORPTION DEVICE FOR A BUMPER ARRANGEMENT OF A MOTOR VEHICLE AND BUMPER ARRANGEMENT OF A MOTOR VEHICLE

(71) Applicant: BENTELER AUTOMOBILTECHNIK GMBH, Paderborn (DE)

(72) Inventor: Jiri Hauptvogel, Gjovik (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 197 days.

(21) Appl. No.: 17/543,869

(22) Filed: Dec. 7, 2021

(65) Prior Publication Data
US 2022/0176901 A1    Jun. 9, 2022

(30) Foreign Application Priority Data
Dec. 7, 2020    (DE) .......................... 102020132481.2

(51) Int. Cl.
*B60R 19/34*    (2006.01)
*B60R 19/18*    (2006.01)

(52) U.S. Cl.
CPC .............. *B60R 19/34* (2013.01); *B60R 19/18* (2013.01)

(58) Field of Classification Search
CPC ... B60R 19/34; B60R 19/18; B60R 2019/182; B60R 2019/247
(Continued)

(56) References Cited

U.S. PATENT DOCUMENTS

| 6,003,930 A | * | 12/1999 | Frank | ...................... B60R 19/34 296/133 |
| 6,705,653 B2 | * | 3/2004 | Gotanda | ................. B60R 19/34 293/133 |

(Continued)

FOREIGN PATENT DOCUMENTS

| CN | 108791506 | | 11/2018 | |
| CN | 108791506 A | * | 11/2018 | ............. B62D 25/08 |

(Continued)

OTHER PUBLICATIONS

Official Action with Machine Translation for German Patent Application No. 102020132481.2, dated Oct. 1, 2021, 15 pages.

(Continued)

*Primary Examiner* — Amy R Weisberg
*Assistant Examiner* — Eronica M Condo
(74) *Attorney, Agent, or Firm* — Sheridan Ross P.C.

(57) ABSTRACT

The invention relates to an energy absorption device for a bumper arrangement of a motor vehicle having at least one closed hollow chamber which is configured over its entire longitudinal extent from a bumper-side end to a vehicle-side end, wherein at least one support element is arranged on an outer wall for support on a bumper of a motor vehicle. The invention is characterized in that two support elements are arranged on the outer wall for support on a bumper of a motor vehicle, said support elements being connected together by means of a connecting web over their entire longitudinal extent which faces away from the at least one hollow chamber and which is shorter than the longitudinal extent of the device, wherein the two support elements and the connecting web together with the outer wall form a further hollow chamber extending in the longitudinal extent of the device.

14 Claims, 7 Drawing Sheets

(58) Field of Classification Search
USPC ................................. 293/120, 122, 133, 154
See application file for complete search history.

(56) References Cited

U.S. PATENT DOCUMENTS

| | | | | |
|---|---|---|---|---|
| 6,871,890 | B2* | 3/2005 | Sato | B60R 19/24 |
| | | | | 293/122 |
| 7,360,811 | B2* | 4/2008 | Roll | F16F 7/12 |
| | | | | 293/133 |
| 8,016,331 | B2* | 9/2011 | Ralston | B60R 19/18 |
| | | | | 293/121 |
| 8,056,926 | B2* | 11/2011 | Okabe | B62D 25/082 |
| | | | | 180/311 |
| 8,348,033 | B2* | 1/2013 | Hayashi | B60R 19/34 |
| | | | | 293/110 |
| 9,102,289 | B2* | 8/2015 | Braunbeck | B60R 19/34 |
| 9,266,484 | B2* | 2/2016 | Nakanishi | B60R 19/34 |
| 9,290,139 | B2* | 3/2016 | Lee | B60R 19/30 |
| 11,148,624 | B2 | 10/2021 | Vovesny | |
| 11,173,958 | B2* | 11/2021 | Ishikawa | B60R 19/34 |
| 2005/0104392 | A1* | 5/2005 | Liebhard | B60R 19/18 |
| | | | | 293/132 |

FOREIGN PATENT DOCUMENTS

| | | | |
|---|---|---|---|
| CN | 111605504 | 9/2020 | |
| DE | 102013007348 | 10/2014 | |
| DE | 202015103827 | 8/2015 | |
| DE | 102014107320 | 11/2015 | |
| DE | 102019108043 | 9/2020 | |
| JP | 2015-217899 | 12/2015 | |
| JP | 2018-075908 | 5/2018 | |
| WO | WO 2012/147179 | 11/2012 | |
| WO | WO-2012147179 A1 * | 11/2012 | ............ B60R 19/26 |

OTHER PUBLICATIONS

Opposition with Machine Translation for German Patent Application No. 102020132481.2, dated May 15, 2023, 31 pages.
Official Action with English Translation for China Patent Application No. 202111511329.0, dated Jun. 20, 2024, 14 pages.

* cited by examiner

ENERGY ABSORPTION DEVICE FOR A BUMPER ARRANGEMENT OF A MOTOR VEHICLE AND BUMPER ARRANGEMENT OF A MOTOR VEHICLE

CROSS-REFERENCE TO RELATED APPLICATION

This application claims the benefit of German Priority Application No. DE 10 2020 132 481.2 filed Dec. 7, 2020, the entire contents of which are incorporated herein by reference.

FIELD

The invention relates to an energy absorption device for a bumper arrangement of a motor vehicle and a bumper arrangement of a motor vehicle having at least one such energy absorption device.

BACKGROUND

Energy absorption devices for a bumper arrangement of a motor vehicle as claimed in the preamble of claim 1 are disclosed, for example, in DE 10 2014 101 320 A1, DE 10 2019 108 043 B3 and DE 20 2015 103 827 U1. In this case, the two first-mentioned publications disclose bumper arrangements having energy absorption devices in the form of crash boxes arranged between a bumper and a longitudinal member of a motor vehicle, in which a support element is provided, said support element being supported firstly on the respective crash box and secondly on the bumper at that point. The strut of DE 10 2014 101 320 A1 is configured in this case in the longitudinal extent thereof as a closed hollow profile or as a U-shaped profile, whilst the strut of DE 10 2019 108 043 B3 has a hollow chamber which is configured transversely to the longitudinal extent of the strut. In both bumper arrangements such a strut is connected separately both to the energy absorption element and to the bumper. To this end, joining steps, for example welding or screwing, are required in order to produce the respective connection. In these bumper arrangements exactly one support element is assigned to each crash box of the bumper arrangement.

The energy absorption devices of DE 20 2015 103 827 U1, however, have in each case two support elements which are arranged as plate-shaped elements on a side chord or an upper and a lower chord for an energy absorption element. The side chords are configured in this case with the upper and the lower chord as a hollow chamber profile for the energy transmission element with the two plate-like support elements. In order to connect the individual shell members having the chords, in this case an energy-intensive welding, which also requires a corresponding welding appliance, is necessary.

However, in the energy absorption devices known from the prior art there is also a need for improvement regarding the stiffness, such that in the event of a crash the energy is able to be dissipated particularly effectively from the energy absorption element or converted into deformation energy.

SUMMARY

Thus it is the object of the invention to develop an energy absorption device for a bumper arrangement of a motor vehicle as claimed in the preamble of claim 1, such that a particularly effective introduction of energy into the energy absorption devices or crash boxes is provided in the event of a crash and an improved conversion of the energy introduced into the device into deformation energy is provided. At the same time, a further object of the invention is intended to be that a reduction in components and a reduced assembly effort are intended to be achieved. It is also the object of the invention to provide a bumper arrangement of a motor vehicle which takes account of these aspects of the energy absorption device.

The object is achieved relative to the energy absorption device by an energy absorption device having all of the features of claim 1. The object is achieved relative to the bumper arrangement by a bumper arrangement having all of the features of claim 10. Advantageous embodiments of the invention are found in the subclaims.

The energy absorption device according to the invention for a bumper arrangement of a motor vehicle has in this case at least one closed hollow chamber which is configured over its entire longitudinal extent from a bumper-side end to a vehicle-side end. In this case, at least one support element is arranged on a side wall of the at least one hollow chamber for support on a bumper of a motor vehicle. The energy absorption device according to the invention is now characterized in that two support elements are arranged on the side wall for support on a bumper of a motor vehicle, said support elements being connected together by means of a connecting web over their entire longitudinal extent which faces away from the at least one hollow chamber and which is shorter than the longitudinal extent of the device or the crash box, wherein the two support elements and the connecting web together with the side wall form a further hollow chamber extending in the longitudinal extent of the device.

By means of the embodiment of the energy absorption device according to the invention it is now achieved that the two support elements are additionally connected together via a connecting web. As a result, it is achieved that in the event of a crash the energy introduced into the energy transmission device in the form of a crash box is introduced particularly effectively and uniformly. At the same time, by means of this embodiment according to the invention it is achieved that the energy input in the longitudinal direction of the energy transmission apparatus may be oriented in a very targeted manner. As a result, the risk of the energy absorption device or the crash box buckling in the event of a crash is significantly minimized. According to an advantageous embodiment, the support elements may also be provided with a bead, in particular a diagonal bead, in order to increase the stability of the energy absorption device further.

According to a first advantageous embodiment of the invention, in this case it is provided that the two support elements are configured such that they have a greater longitudinal extent in the region of the side wall of the at least one hollow chamber than in the region of the connecting web, such that over the entire longitudinal extent of the device the further hollow chamber is closed only in some longitudinal sections. By means of this embodiment, it is advantageously achieved that due to the further hollow chamber the stiffness of the energy transmission apparatus does not become too great, whereby an effective deformation of the energy transmission apparatus might no longer be possible in the event of a crash. In particular, the deformation characteristic of the device according to the invention may be individually adapted by means of this embodiment of the invention, by varying the configuration of the further hollow profile which is closed only in some longitudinal sections.

A particularly advantageous embodiment of the invention is the one-piece embodiment of the energy absorption device according to the invention or the crash box, wherein this one-piece embodiment is preferably configured as an extrusion profile, particularly preferably as an aluminum extrusion profile. In this case, it is necessary that the further hollow chamber obtains its final shape, which is closed only in some longitudinal sections, by a post-treatment, in particular by sawing, stamping, cutting, or the like. Additional working steps during the production of individual parts and the joining thereof by welding, screwing or the like, are avoided, however, by means of such an embodiment of the invention, such that a significantly reduced effort in terms of resources is provided and the effort in terms of logistics is also significantly minimized. In this case, it should also be mentioned that the energy absorption devices in any case have to be adapted at the ends thereof, after the extrusion in the end regions thereof, by a post-treatment to the connecting regions of the respective bumper and the chassis.

According to a further advantageous embodiment of the invention, it is provided that a vehicle-side connecting edge of at least one support element running between the side wall and the connecting web forms an angle $\alpha<45°$, preferably $\alpha<30°$, with the side wall of the at least one hollow chamber. By means of this embodiment of the invention, it is advantageously achieved that the support elements may be adapted in a simple manner to the respective characteristic of the bumper arrangement and the motor vehicle in which they are intended to be used.

The same object is achieved by the embodiment of the invention according to which a vehicle-side connecting edge of at least one support element running between the side wall and the connecting web runs in a linear manner. Alternatively, it is also possible that a vehicle-side connecting edge of at least one support element running between the side wall and the connecting web is configured to be curved. Such linear or curved paths may be implemented in a particularly simple manner by sawing, cutting or stamping.

According to a further embodiment of the invention, it may also be provided that a vehicle-side connecting edge of at least one support element running between the side wall and the connecting web extends as far as the vehicle-side end.

Alternatively, it is also possible that a vehicle-side connecting edge of at least one support element running between the side wall and the connecting web is configured such that it comes into contact with the side wall between the bumper-side end and the vehicle-side end.

By the corresponding variants set forth above of the connecting edge of at least one support element, advantageously the deformation characteristic and the energy input characteristic of the energy absorption device may be particularly easily adapted to the respective motor vehicle or the respective bumper arrangement.

According to a further idea of the invention, it is provided that connecting elements are arranged or are able to be arranged on the bumper-side end and the vehicle-side end, in order to connect the device at the bumper-side end to a bumper and at the vehicle-side end to the chassis of a motor vehicle, in particular a longitudinal member of a motor vehicle. Such connecting elements may be configured, after the extrusion of the energy absorption device, in a secondary reshaping or post-treatment step in one piece with the energy transmission device or the crash box. However, it is also possible to connect such connecting elements in the form of a separate flange to the energy transmission device or the crash box, such that this may then be connected to the corresponding bumper or the chassis or longitudinal member of a motor vehicle. The connection may be carried out in this case by conventional joining methods, such as for example welding, screwing or the like.

Finally, a bumper arrangement of a motor vehicle having a bumper and at least one, in particular two, energy absorption devices or crash boxes of the type described above is also intended to be protected. In particular, when using two energy transmission devices according to the invention or crash boxes in such a bumper arrangement, it is particularly advantageous if the support elements of the two energy transmission devices or the two crash boxes face toward the transverse axis of the bumper or toward the longitudinal axis of the respective motor vehicle. This has the advantage that, as a result, the spacings between the two energy absorption devices or crash boxes may be varied relative to one another, whereby the crash and deformation characteristic and the energy absorption may also be adapted in a particularly effective manner to the respective bumper arrangement or the respective motor vehicle.

BRIEF DESCRIPTION OF THE DRAWINGS

Further objects, advantages, features and possible applications of the present invention emerge from the following description of exemplary embodiments with reference to the drawings. In this case, all of the features described and/or illustrated form the subject of the present invention individually or in any meaningful combination, irrespective of the summary thereof in the claims or the back reference thereof.

In the drawings.

DETAILED DESCRIPTION

Figure 1:
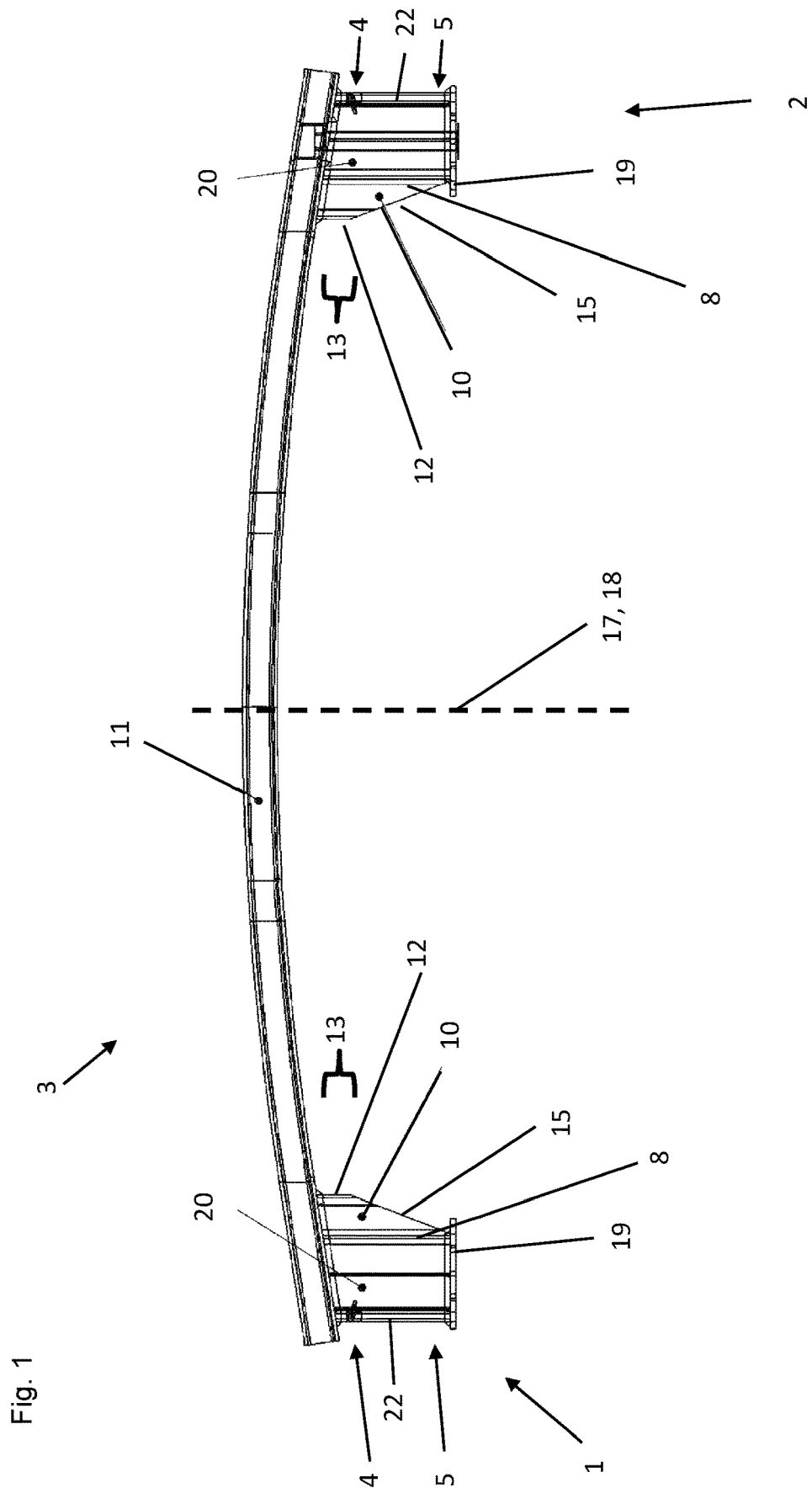
FIG. 1: shows a first exemplary embodiment of a bumper arrangement according to the invention with two energy absorption devices according to the invention or crash boxes in a plan view from above.

An exemplary embodiment of a bumper arrangement 3 according to the invention is shown in a plan view from above in FIG. 1. Exemplary embodiments of an energy transmission device according to the invention or crash box 1 and 2 are arranged on the bumper arrangement 3 at the end regions thereof. In the present exemplary embodiment, the two energy transmission devices or crash boxes 1 and 2 are configured identically but are arranged mirror-symmetrically relative to the transverse axis 17 of the bumper arrangement 3 or the vehicle longitudinal axis 18. Due to this identical design, both relative to FIG. 1 and relative to the following FIGS. 2 and 3, reference is made hereinafter only relative to the left-hand energy transmission device or crash box 1 of FIG. 1.

The energy transmission device or crash box 1 in this case consists substantially of a hollow chamber profile which is formed from two side walls 8 and 22 which connect together an upper wall 20 and a lower wall 21. In the present exemplary embodiment, the hollow chamber profile of the crash box 1 is configured as a two-chamber hollow profile with two hollow chambers 6 and 7, as visible in particular in FIG. 2, which are separated from one another by a partition 23. The partition 23 runs in this case substantially perpendicular to the side walls 8 and 22 and substantially parallel to the lower wall 21 and the upper wall 20. The crash box 1 in this case is joined at its bumper-side end 4 to a bumper 11 of the bumper arrangement 3. The joining in this case may be carried out by means of known connecting techniques, such as for example screwing or welding. A flange 19 is arranged on the vehicle-side end 5 of the crash box 1, the crash box 1 being able to be connected by said flange to a chassis or a longitudinal member of a motor vehicle.

Figure 2:
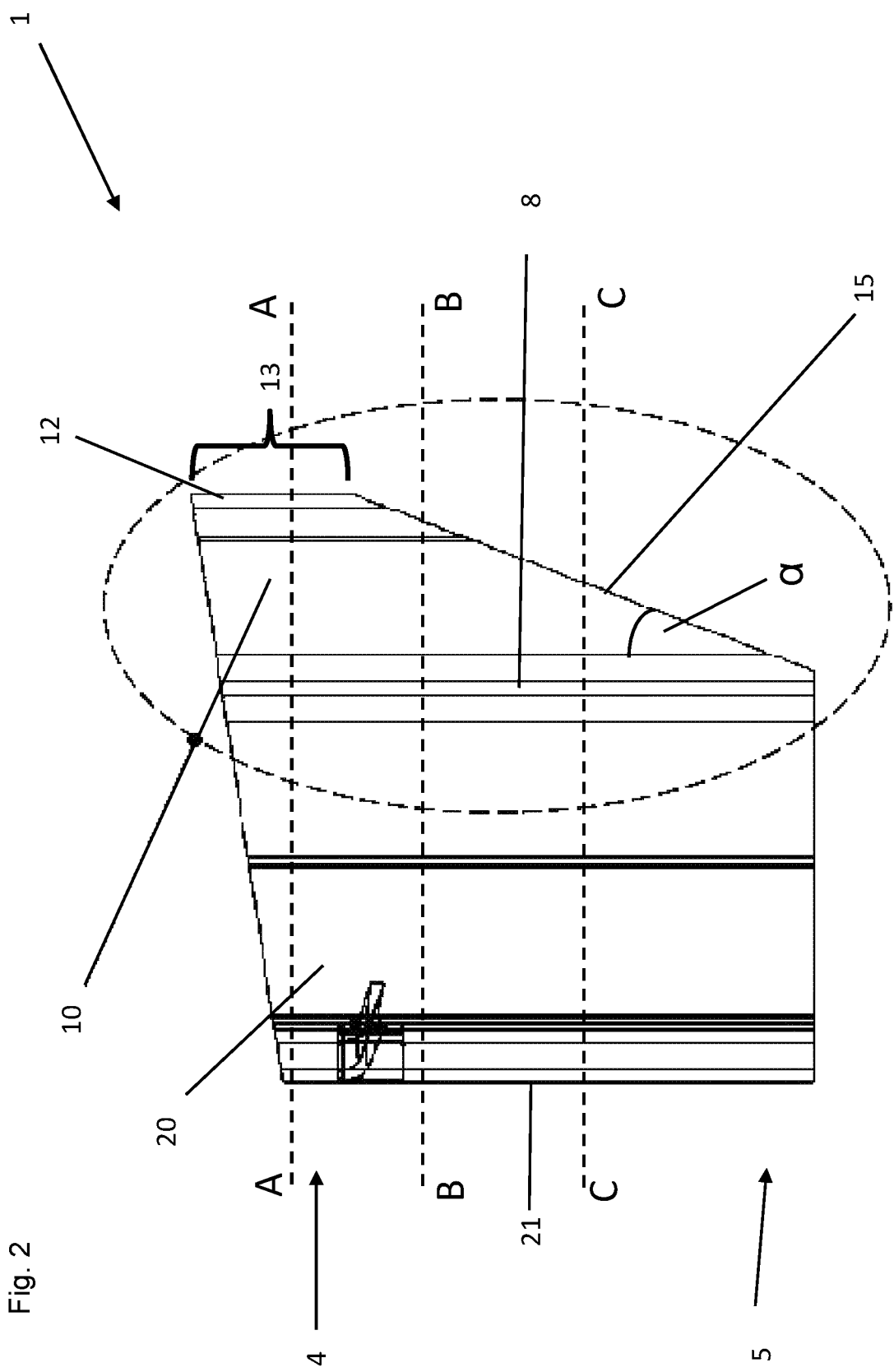
FIG. 2: shows the left-hand energy transmission device or crash box of FIG. 1 in a plan view from above.

Two substantially plate-shaped support elements 9 and 10 are now arranged on the side wall 8 of the crash box 1 which faces the crash box 2, said support elements being connected together by means of a connecting web 12, as visible in particular in FIG. 2. In this case, the side wall 8 and the connecting web 12 together with the support elements 9 and 10 form a further hollow chamber 14, as is visible in particular in FIG. 3. The connecting web 12 of the crash box 1 extends in terms of its longitudinal extent 13 only over a part of the longitudinal extent of the crash box 1. As a result, the support elements 9 and 10 in each case have a connecting edge 15, 16 which extends from the vehicle-side end 5 of the crash box 1 to the connecting web 12. Since the hollow chamber 14 does not extend over the entire longitudinal extent of the actual crash box 1, it forms an open hollow chamber, whilst the hollow chambers 6, 7 of the crash box 1 are configured to be closed in an uninterrupted manner over the entire longitudinal extent of the crash box 1.

Figure 3:
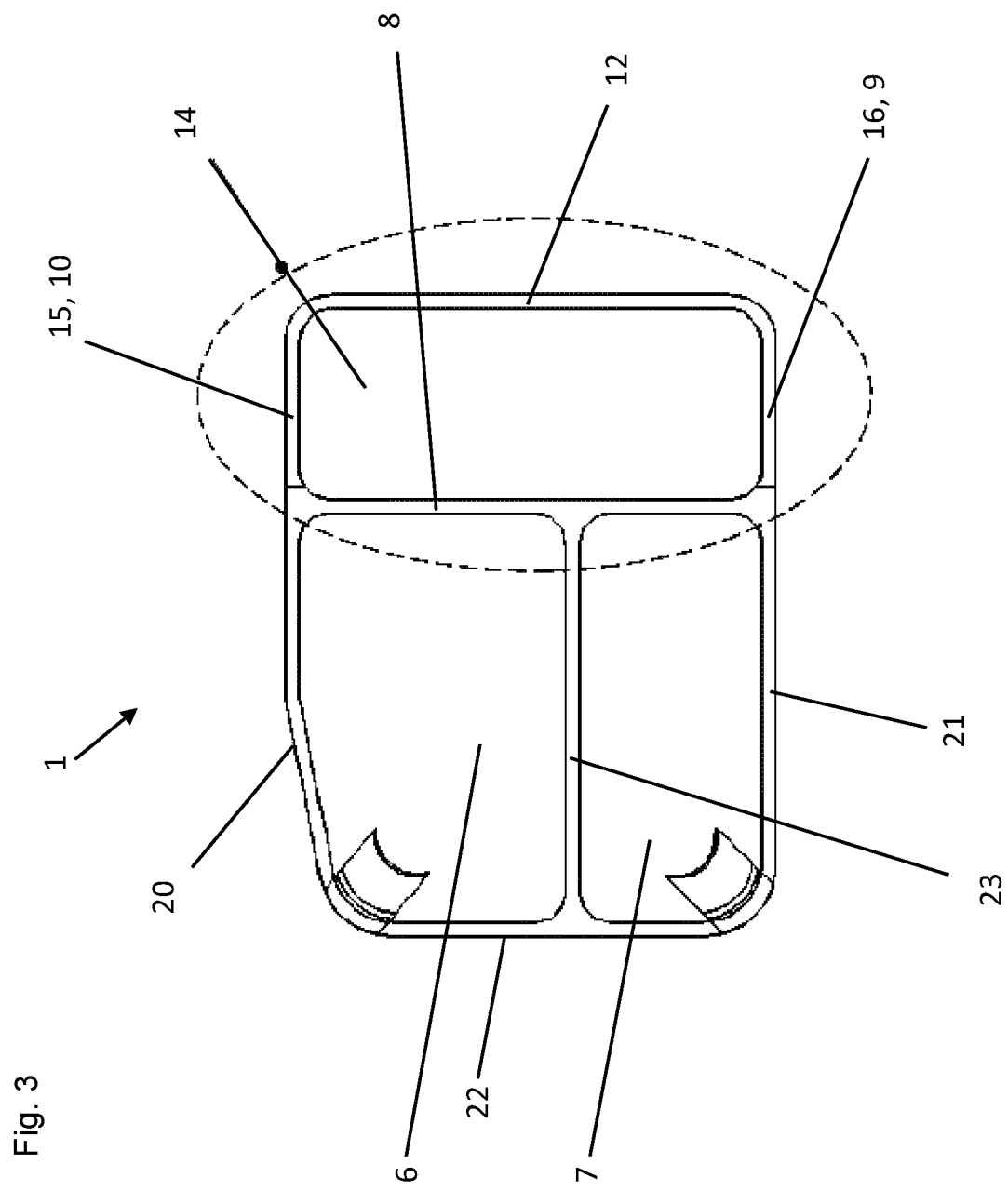
FIG. 3: shows the energy transmission device or crash box of FIG. 2 along the cutting surface A-A.

The energy absorption device or crash box 1 of FIG. 1 is now shown in detail in FIG. 2 in a plan view from above. It may be clearly identified here that the extrusion profile produced in one piece has to be post-treated before use as an energy absorption device according to the invention or crash box 1. To this end, an adaptation of the contour to the bumper 11 to which the crash box 1 is intended to be connected has to take place on the bumper-side end 4. Moreover, the open hollow chamber 14 has to be configured to be open by post-treatment, for example cutting, sawing or stamping, wherein the support elements 9 and 10 and the connecting edges 15 and 16 are formed. In FIG. 3 it may be clearly identified here that by this post-treatment the longitudinal extent 13 of the connecting web is significantly shortened relative to the longitudinal extent of the crash box. During this post-treatment the angle α is also set between the connecting edges 15, 16 and the side wall 8.

In the present exemplary embodiment, the post-treatment of the extrusion profile is carried out such that the energy absorption device or crash box 1 thus produced has support elements 9 and 10 which extend from the vehicle-side end 5 of the crash box 1 to the connecting web 12. In the present exemplary embodiment the angle α is approximately 25°. In principle, however, it is also conceivable that starting from the connecting web 12 the connecting edges 15 and 16 do not run as far as the vehicle-side end 5 of the crash box 1. In other exemplary embodiments it is possible that these connecting edges 15 and 16 between the vehicle-side end 5 and bumper-side end 4 are in contact with the side wall 8.

In FIG. 3 the crash box 1 is now shown in a sectional view along the cutting plane A-A of FIG. 2, wherein the flange 19 shown in FIG. 1 is not yet arranged on the crash box 1. It is possible to identify clearly the hollow chamber profile of the crash box 1 with its two hollow chambers 6 and 7 separated by a partition 23. The hollow chamber profile of the crash box 1 in this case is formed by an upper wall 20 and a lower wall 21, which are connected together by the side walls 8 and 22. The partition 23 separating the hollow chambers 6 and 7 in this case is perpendicular to the side walls 8 and 22 and runs substantially parallel to the lower wall 21 and the upper wall 20. In the present exemplary embodiment, a plate-shaped support element 10 is attached in the region of the upper wall 20, said support element being substantially perpendicular to the side wall 8. In the view according to FIG. 2, in a plan view of the connecting edge 15, the support element 10 is shown between the side wall 8 and the connecting web 12. In the same manner, a further support element 9 is attached in the region of the lower wall 21, said support element also extending as far as the connecting web 12, and the view according to FIG. 2 is a view of the connecting edge 16 thereof.

In the view of FIG. 3 it may be identified that such energy absorption devices or crash boxes 1 may be particularly easily produced as extrusion profiles. In particular, embodiments as aluminum extrusion profiles are suitable in this case. Such extrusion profiles may be produced in one piece in a particularly simple manner which has been perfected in terms of method technology.

Figure 4:
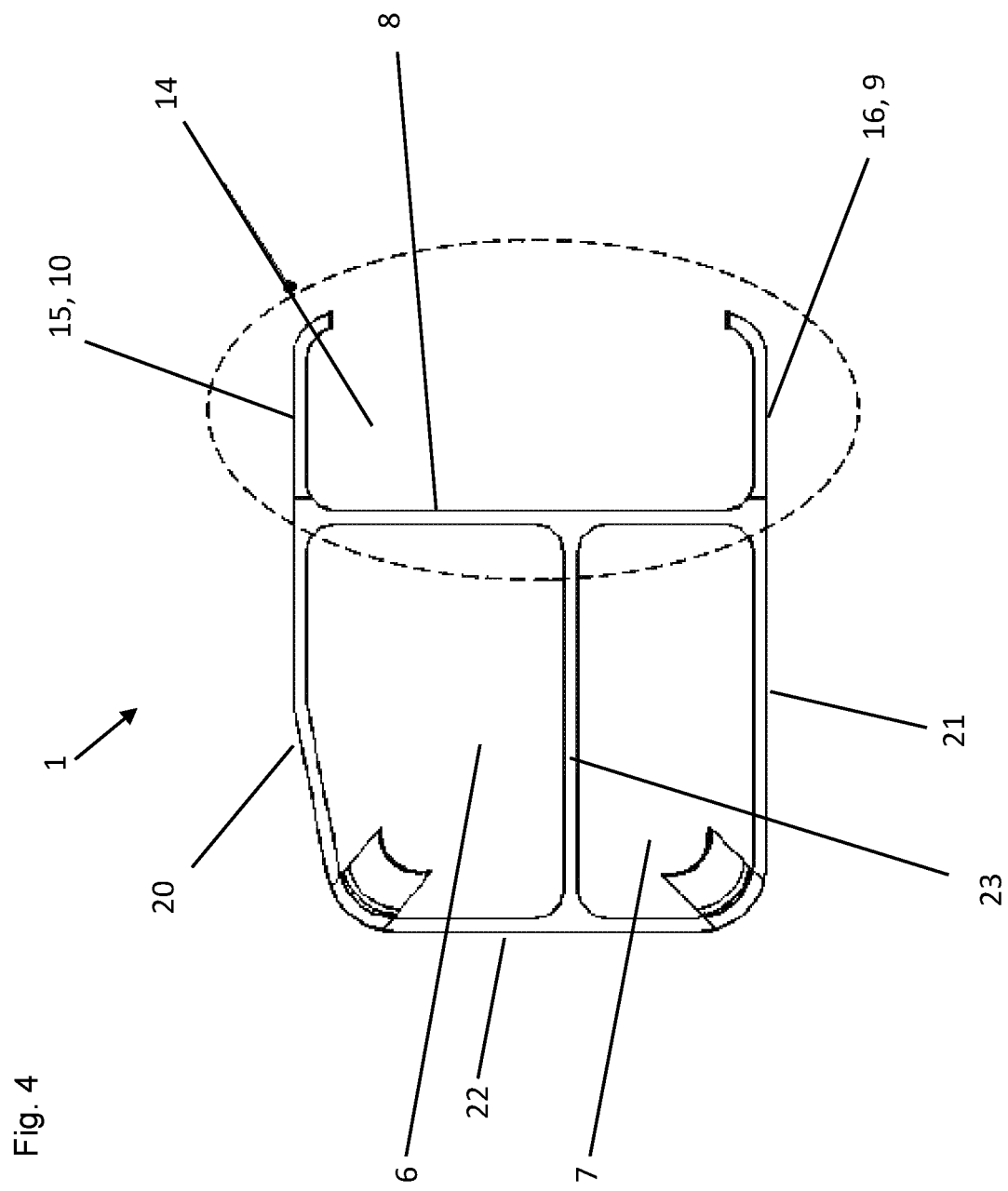
FIG. 4: shows the energy transmission device or crash box of FIG. 2 along the cutting surface B-B.

In FIG. 4 the crash box 1 is also shown in a sectional view along the cutting plane B-B of FIG. 2. As is visible therefrom, in this region the connecting web 12 of the support elements 9 and 10 which is still visible in FIG. 3 is cut out. Only the curved transition region is still present between the support elements 9, 10 and the connecting web which is no longer present. All of the other elements of the energy absorption device 1 are otherwise unchanged relative to the view according to FIG. 2. In this regard only the closed hollow chamber 14 is now no longer present. Instead the hollow chamber is now already designed to be open in the region of the cutting plane B-B.

Figure 5:
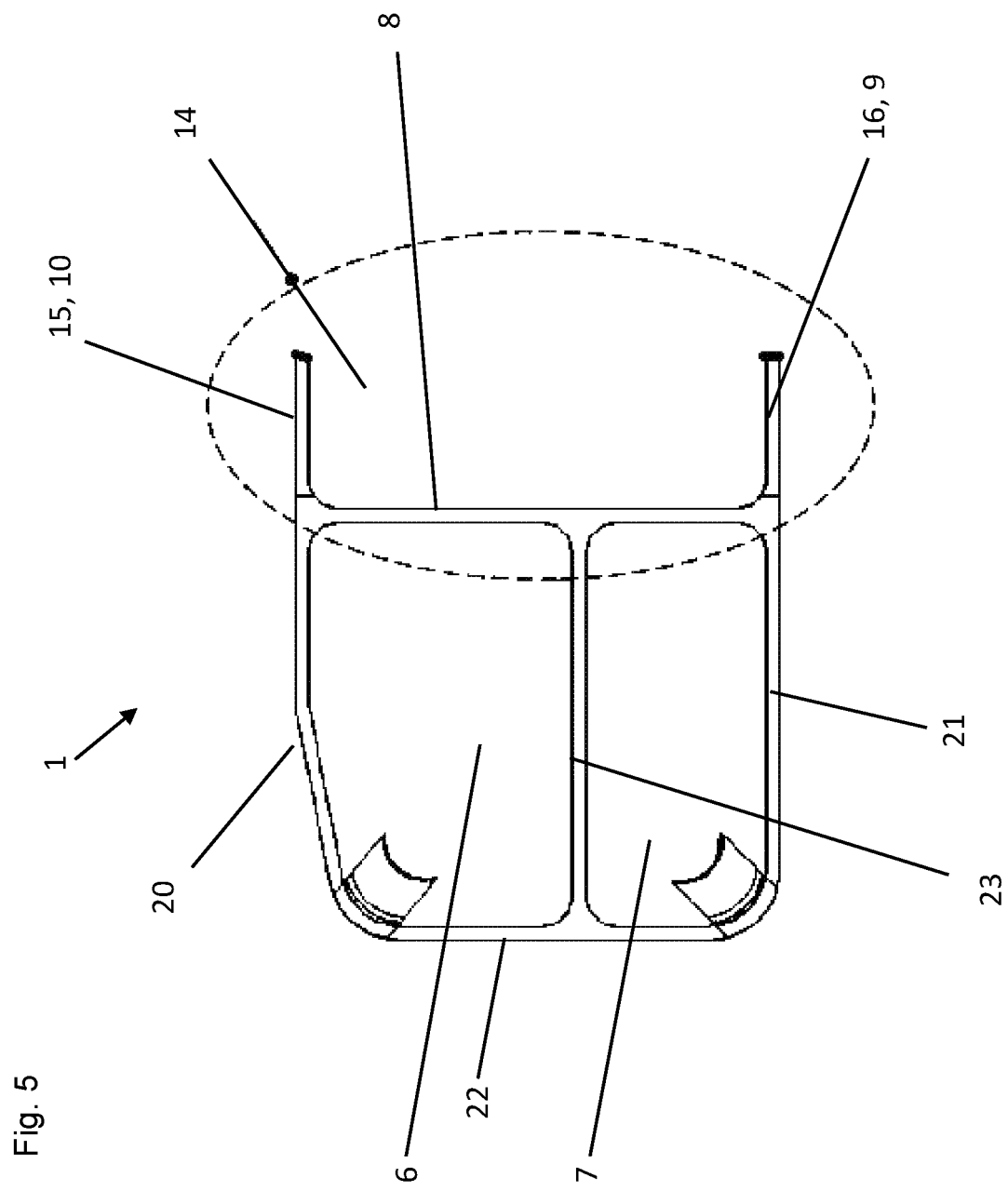
FIG. 5: shows the energy transmission device or crash box of FIG. 2 along the cutting surface C-C.

The view shown in FIG. 5 is implemented along the cutting plane C-C of FIG. 2. It is clearly visible here that the transition regions of the support elements 9, 10 with the connecting web 12 are now no longer present. These transition regions have now also been cut out. In this regard, the connecting webs 9 and 10 in this region are also significantly shorter than in the region of the cutting plane B-B or A-A of FIGS. 4 and 3. Passing further to the vehicle-side end of the crash box 1, the support elements 9 and 10 become increasingly short until they completely disappear at the end of the crash box 1.

Figure 6:
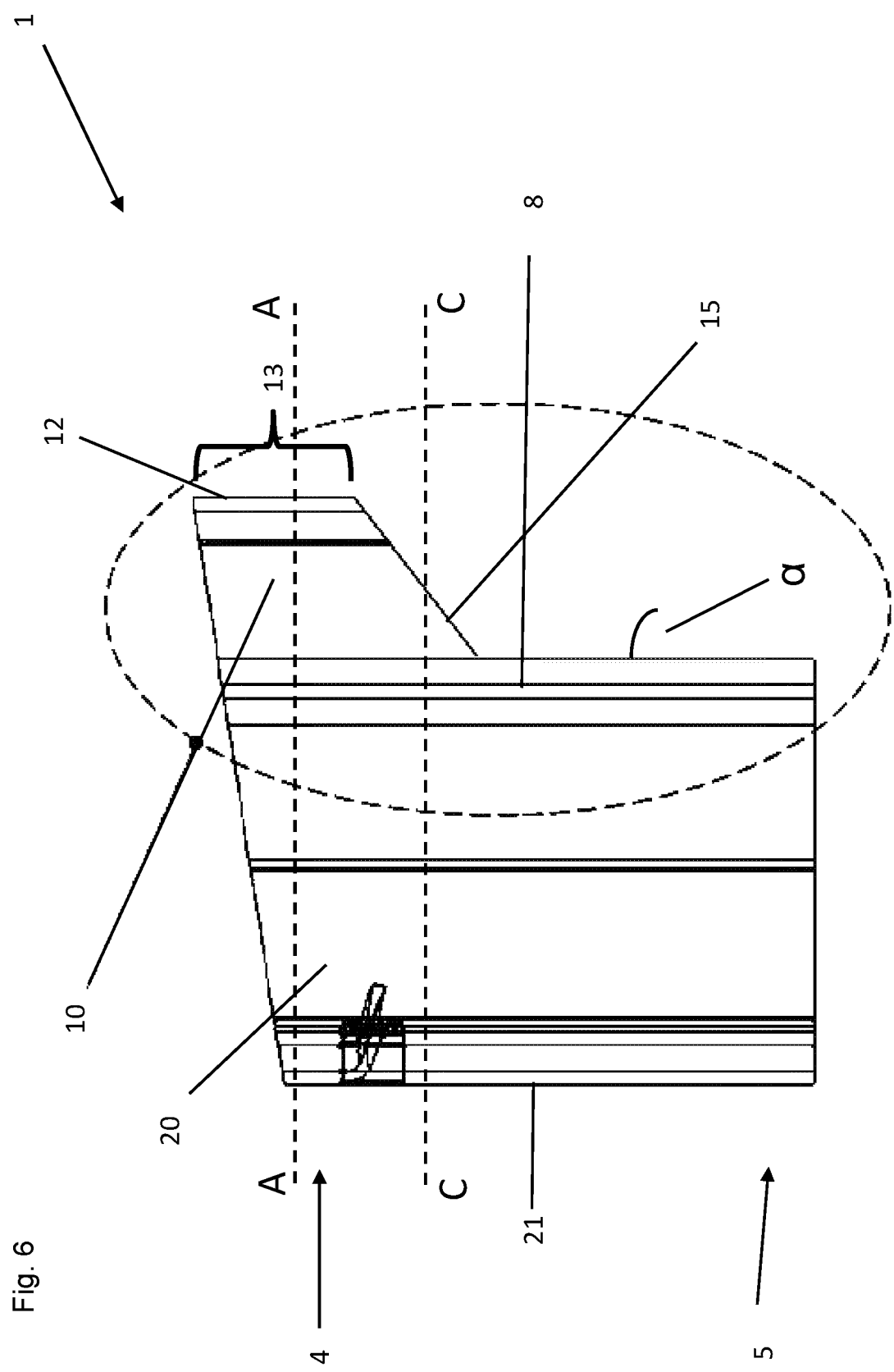
FIG. 6: shows a second exemplary embodiment of an energy absorption device according to the invention or crash box in a plan view from above

FIG. 6 now shows a second exemplary embodiment of an energy absorption device according to the invention or crash box 1 in a plan view from above. In this exemplary embodiment, the support elements 9 and 10 are changed relative to the exemplary embodiment of FIGS. 1 to 5. The support elements 9 and 10 of FIG. 6 now do not run as far as the vehicle-side end but only approximately as far as the center of the longitudinal extent of the crash box 1. This results in the connecting edges 15 and 16 being significantly shorter than in the first exemplary embodiment. This has the result that a sectional view along the cutting plane C-C corresponds at that point to the sectional view of the exemplary embodiment of FIG. 5. However, the cutting plane C-C of the exemplary embodiment of FIG. 6 is level with the cutting plane B-B of the first exemplary embodiment corresponding to FIG. 2.

Figure 7:
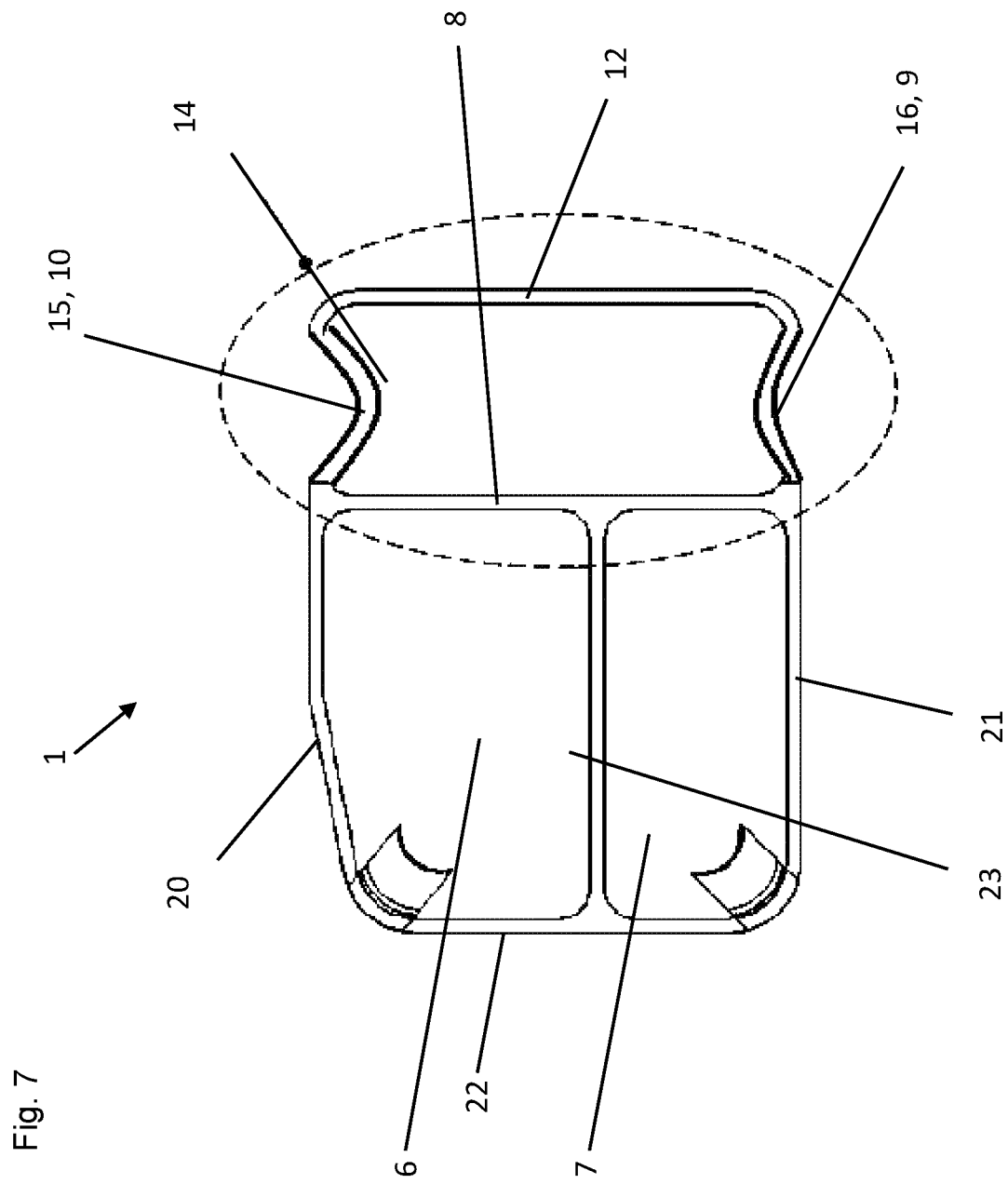
FIG. 7: shows a third exemplary embodiment of an energy absorption device or crash box in a sectional view.

In FIG. 7 a further exemplary embodiment of an energy absorption device according to the invention or crash box 1 is shown in a sectional view. In this exemplary embodiment, the sectional view in the bumper-side region may be designed corresponding to the sectional view of FIG. 3 of the first exemplary embodiment. The hollow chamber 14 therein is now reduced in cross section, by the connecting webs 9 and 10 being compressed and bent toward the interior of the hollow chamber 14. The hollow chamber 14 is now increasingly reduced from the bumper-side end to the vehicle-side end until it is reduced at the vehicle-side end such that the connecting webs 9 and 10 are folded, such that they bear in each case with half of their length against the side wall 8 of the hollow chambers 6 and 7 and the connecting web 12. However, in a particular embodiment of this exemplary embodiment, the connecting web 12 may also be cut out or cut away toward the vehicle-side end. The same also applies to the support elements 9 and 10.

In further exemplary embodiments it is also possible that the connecting edges 15 and 16 are not designed to be linear as in the present exemplary embodiment, but they have a curvature. The exact embodiment of the support elements 9 and 10 with their connecting edges 15 and 16 and of the connecting web may be adapted in this case to the circumstances of the respective vehicle type or the respective bumper arrangement 3.

LIST OF REFERENCE NUMERALS

1 Energy absorption device, crash box
2 Energy absorption device, crash box
3 Bumper arrangement
4 Bumper-side end
5 Vehicle-side end
6 Hollow chamber
7 Hollow chamber
8 Side wall
9 Support element
10 Support element
11 Bumper
12 Connecting web
13 Longitudinal extent
14 Hollow chamber
15 Connecting edge
16 Connecting edge
17 Transverse axis
18 Vehicle longitudinal axis
19 Flange
20 Upper wall
21 Lower wall
22 Side wall
23 Partition

What is claimed is:

1. An energy absorption device for a bumper arrangement of a motor vehicle, comprising:
    at least one closed hollow chamber which is configured over its entire longitudinal extent from a bumper-side end to a vehicle-side end,
    wherein the at least one closed hollow chamber is formed by a first side wall, a second side wall, an upper wall, and a lower wall,
    wherein the first side wall is parallel to the second side wall,
    wherein two support elements are joined to one of the first and second side walls,
    wherein the two support elements are connected together by a connecting web,
    wherein the connecting web is parallel to the first and second side walls,
    wherein a longitudinal extent of the connecting web is shorter than a longitudinal extent of the first and second side walls,
    wherein the first side wall is an outer wall in an inward direction of the motor vehicle,
    wherein an end portion of the two support elements on the bumper-side end is supported on the bumper of a motor vehicle, and
    wherein the two support elements and the connecting web together with the outer wall form a further hollow chamber extending in a direction of a longitudinal extent of the device.

2. The device as claimed in claim 1, wherein the two support elements are configured such that they have a greater longitudinal extent in a region of the outer wall than in a region of the connecting web, such that over the longitudinal extent of the device the further hollow chamber is configured to be closed only in some longitudinal sections.

3. The device as claimed in claim 1, wherein it is configured as an aluminum extrusion profile, wherein the further hollow chamber obtains its final shape, which is closed only in some longitudinal sections, by a post-treatment.

4. The device as claimed in claim 1, wherein a vehicle-side connecting edge of at least one support element running between the outer wall and the connecting web forms an angle $\alpha<45°$ with the outer wall of the at least one closed hollow chamber.

5. The device as claimed in claim 1, wherein a vehicle-side connecting edge of at least one support element running between the outer wall and the connecting web runs in a linear manner.

6. The device as claimed in claim 1, wherein a vehicle-side connecting edge of at least one support element running between the outer wall and the connecting web is configured to be curved.

7. The device as claimed in claim 1, wherein a vehicle-side connecting edge of at least one support element running between the outer wall and the connecting web extends as far as the vehicle-side end.

8. The device as claimed in claim 1, wherein a vehicle-side connecting edge of at least one support element running between the outer wall and the connecting web is configured such that it comes into contact with the outer wall between the bumper-side end and the vehicle-side end.

9. The device as claimed in claim 1, wherein connecting elements are arranged or are able to be arranged on the bumper-side end and the vehicle-side end, in order to connect the device at the bumper-side end to the bumper and at the vehicle-side end to a chassis of the motor vehicle, in particular a longitudinal member of a motor vehicle.

10. A bumper arrangement of a motor vehicle having a bumper and at least one, in particular two, energy absorption devices as claimed in claim 1.

11. The device as claimed in claim 1, wherein it is configured as an aluminum extrusion profile, wherein the further hollow chamber obtains its final shape, which is closed only in some longitudinal sections, by a stamping.

12. The device as claimed in claim 1, wherein it is configured as an aluminum extrusion profile, wherein the further hollow chamber obtains its final shape, which is closed only in some longitudinal sections, by a cutting.

13. The device as claimed in claim 1, wherein it is configured as an aluminum extrusion profile, wherein the further hollow chamber obtains its final shape, which is closed only in some longitudinal sections, by a stamping and a cutting.

14. The device as claimed in claim 1, wherein a vehicle-side connecting edge of at least one support element running between the outer wall and the connecting web forms an angle $\alpha < 30°$ with the outer wall of the at least one closed hollow chamber.

\* \* \* \* \*